US012576756B2

(12) United States Patent
Vibhuti et al.

(10) Patent No.: US 12,576,756 B2
(45) Date of Patent: Mar. 17, 2026

(54) CHILD RESTRAINT WITH MOVABLE HEADREST

(71) Applicant: Dorel Juvenile Group, Inc., Foxboro, MA (US)

(72) Inventors: Pradeep Vibhuti, Columbus, IN (US); Scott M. Holmecki, Bargersville, IN (US); William P. McHugh, Norfolk, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 374 days.

(21) Appl. No.: 18/197,342

(22) Filed: May 15, 2023

(65) Prior Publication Data

US 2023/0365033 A1     Nov. 16, 2023

Related U.S. Application Data

(60) Provisional application No. 63/342,232, filed on May 16, 2022.

(51) Int. Cl.
*B60N 2/28*          (2006.01)
(52) U.S. Cl.
CPC ......... *B60N 2/2851* (2013.01); *B60N 2/2875* (2013.01)

(58) Field of Classification Search
CPC ............................ B60N 2/2851; B60N 2/2875
See application file for complete search history.

(56) References Cited

U.S. PATENT DOCUMENTS

| | | |
|---|---|---|
| 6,623,074 B2 | 9/2003 | Asbach |
| 6,820,939 B1 | 11/2004 | Chen |
| 7,140,687 B2 | 11/2006 | Hoekstra |
| 7,370,912 B2 | 5/2008 | Williams |
| 7,862,117 B2 | 1/2011 | Hutchinson |
| 8,087,725 B2 | 1/2012 | Hutchinson |
| 8,474,907 B2 | 7/2013 | Weber |
| 8,845,021 B2 | 9/2014 | Hou |
| 9,022,472 B2 | 5/2015 | Chen |
| 9,114,739 B2 | 8/2015 | Conway |
| 9,211,817 B2 | 12/2015 | Leese |
| 9,415,707 B2 | 8/2016 | Böhm |
| 11,260,778 B2 | 3/2022 | Duan |
| 11,318,866 B2 | 5/2022 | Zhao |
| 2020/0148079 A1 | 5/2020 | Duan |
| 2020/0223333 A1 | 7/2020 | Mason |

*Primary Examiner* — Anthony D Barfield
(74) *Attorney, Agent, or Firm* — Barnes & Thornburg LLP

(57)          ABSTRACT

A juvenile seat comprising a seat bottom and a seat back arranged to extend upwardly away from the seat bottom. The seat back including a backrest coupled to the seat bottom, a movable headrest coupled to the backrest for up-and-down movement relative to the backrest, and a headrest-height controller arranged to extend between and interconnect the backrest and the movable headrest.

20 Claims, 5 Drawing Sheets

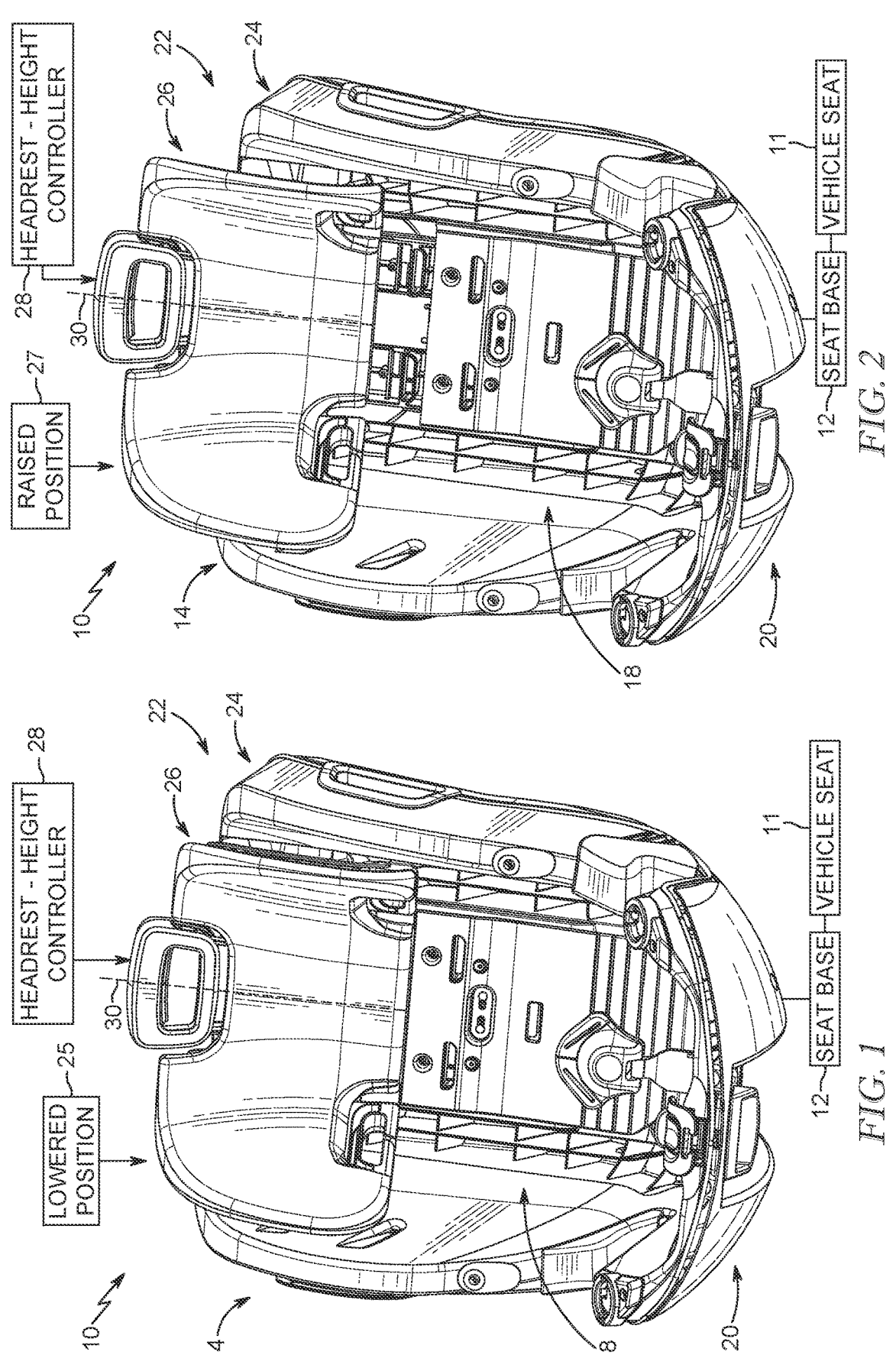

CHILD RESTRAINT WITH MOVABLE HEADREST

PRIORITY CLAIM

Figure 3:
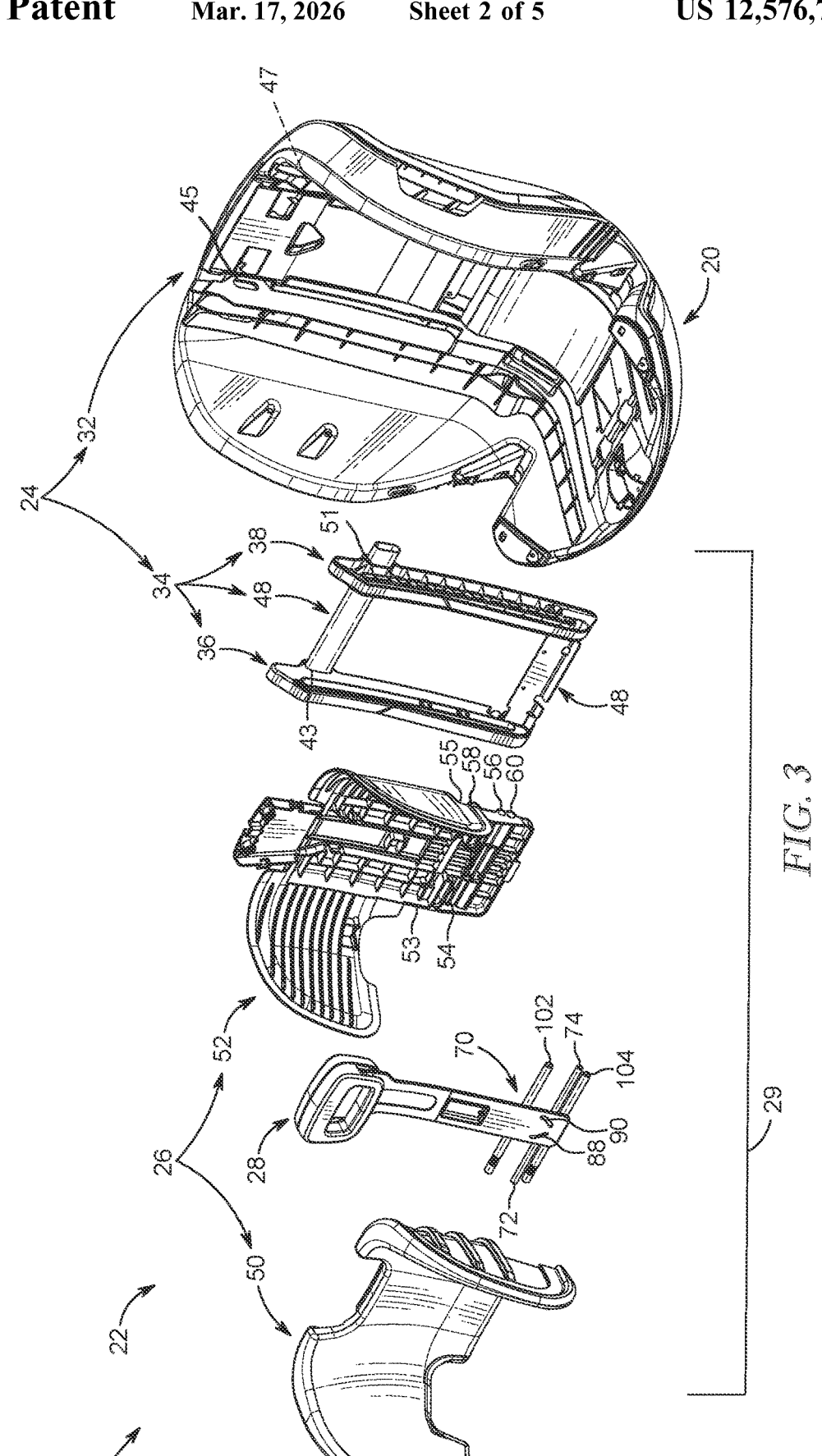

This application claims priority under 35 U.S.C. § 119(e) to U.S. Provisional Application Ser. No. 63/342,232, filed May 16, 2022, which is expressly incorporated by reference herein.

BACKGROUND

The present disclosure relates to a child restraint, and particularly to a child restraint including a juvenile seat. More particularly, the present disclosure relates to child restraint including a juvenile seat that is configured to be secured to a vehicle seat for transportation in the vehicle.

SUMMARY

According to the present disclosure, a juvenile seat is adapted to be secured to a vehicle seat. The juvenile seat includes a seat bottom and a seat back arranged to extend upwardly away from the seat bottom. The seat back includes a backrest coupled to the seat bottom, a movable headrest coupled to the backrest for up-and-down movement along a headrest-travel path relative to the backrest, and a headrest-height controller arranged to extend between and interconnect the backrest and the movable headrest to selectively block up-and-down movement of the movable headrest relative to the backrest.

In illustrative embodiments, the backrest includes a backrest shell and a support frame coupled to the backrest shell. The support frame has a first side frame member formed to include a first guide channel and a plurality of first apertures opening into the first guide channel and a second side frame member formed to include a second guide channel and a plurality of second apertures opening into the second guide channel. Each aperture in the plurality of first apertures is aligned with a corresponding aperture in the plurality of second apertures.

In illustrative embodiments, the headrest-height controller includes a first lock pin configured to extend through one of the plurality of first apertures in the first side frame member, an opposite, second lock pin configured to extend through one of the plurality of second apertures in the second side frame member, and an adjustment handle coupled to the movable headrest for movement relative to the movable headrest between an unactuated position in which the first and second lock pins extend into the one of the plurality of first apertures and the one of the plurality of second apertures to block up-and-down movement of the movable headrest relative to the backrest and an actuated position in which the adjustment handle pulls the first and second lock pins inwardly toward one another and out of the one of the plurality of first apertures and the one of the plurality of second apertures so that the movable headrest is free for up-and-down movement relative to the backrest.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 4:
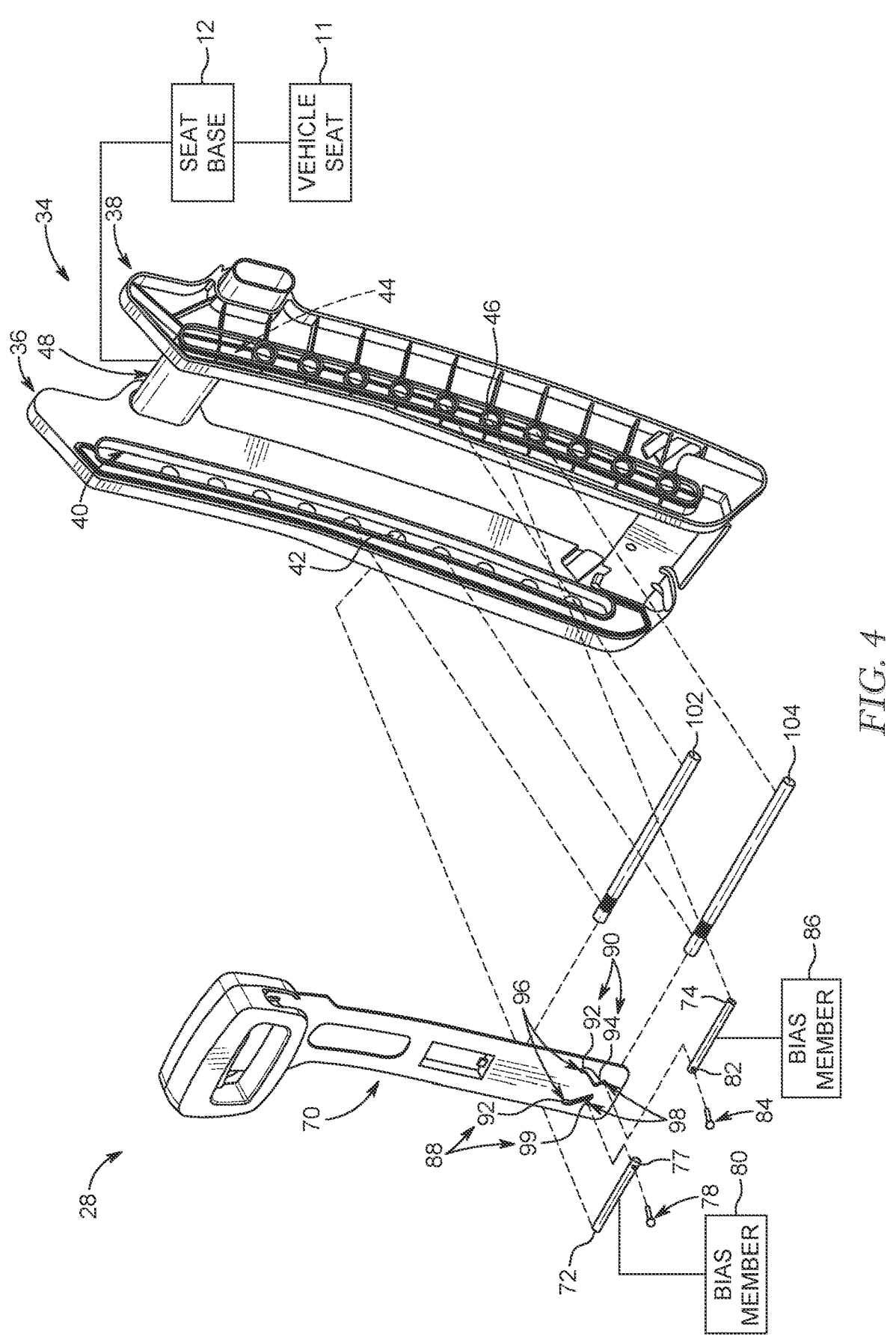
Figures 5, 6:
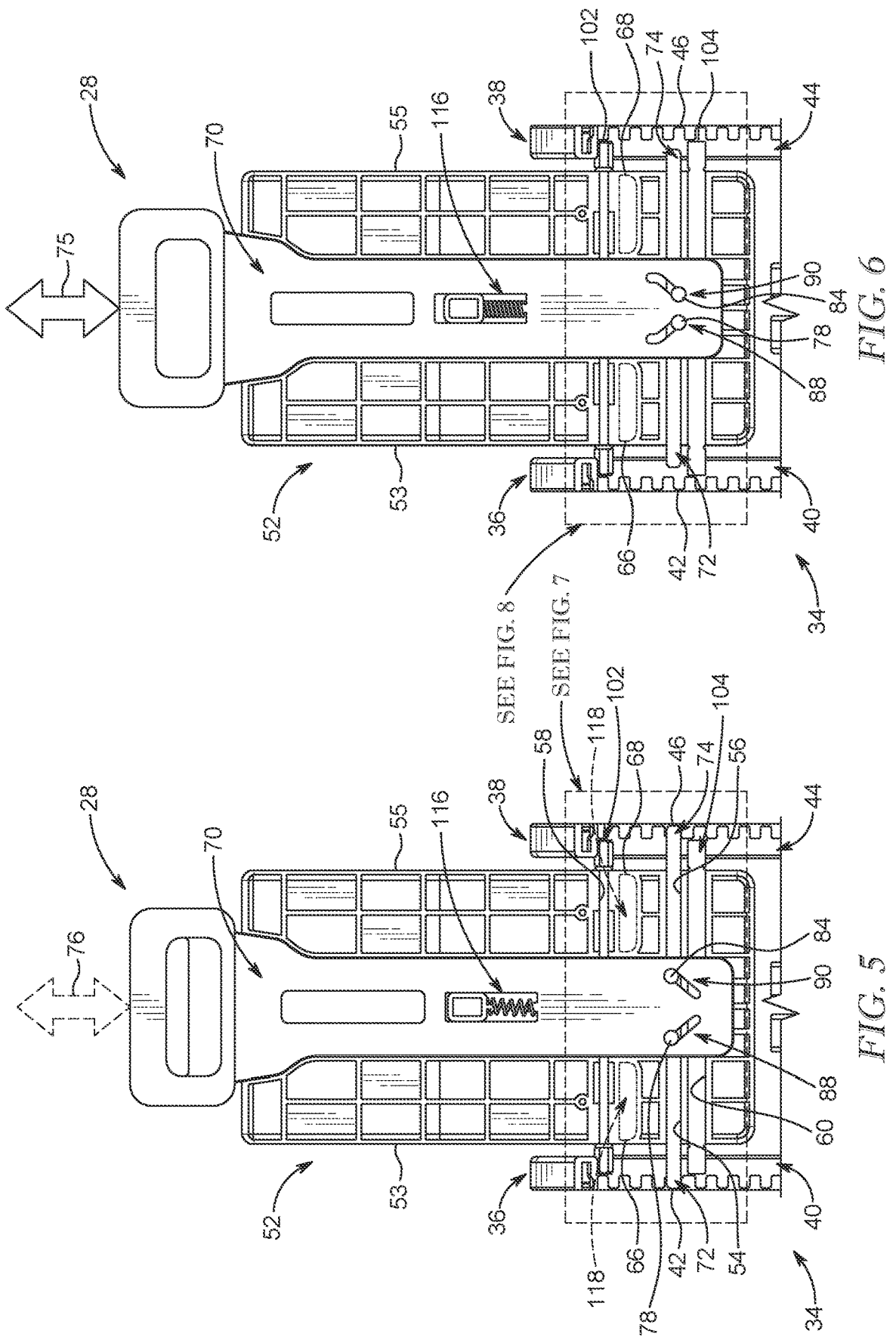
Figures 7, 8:
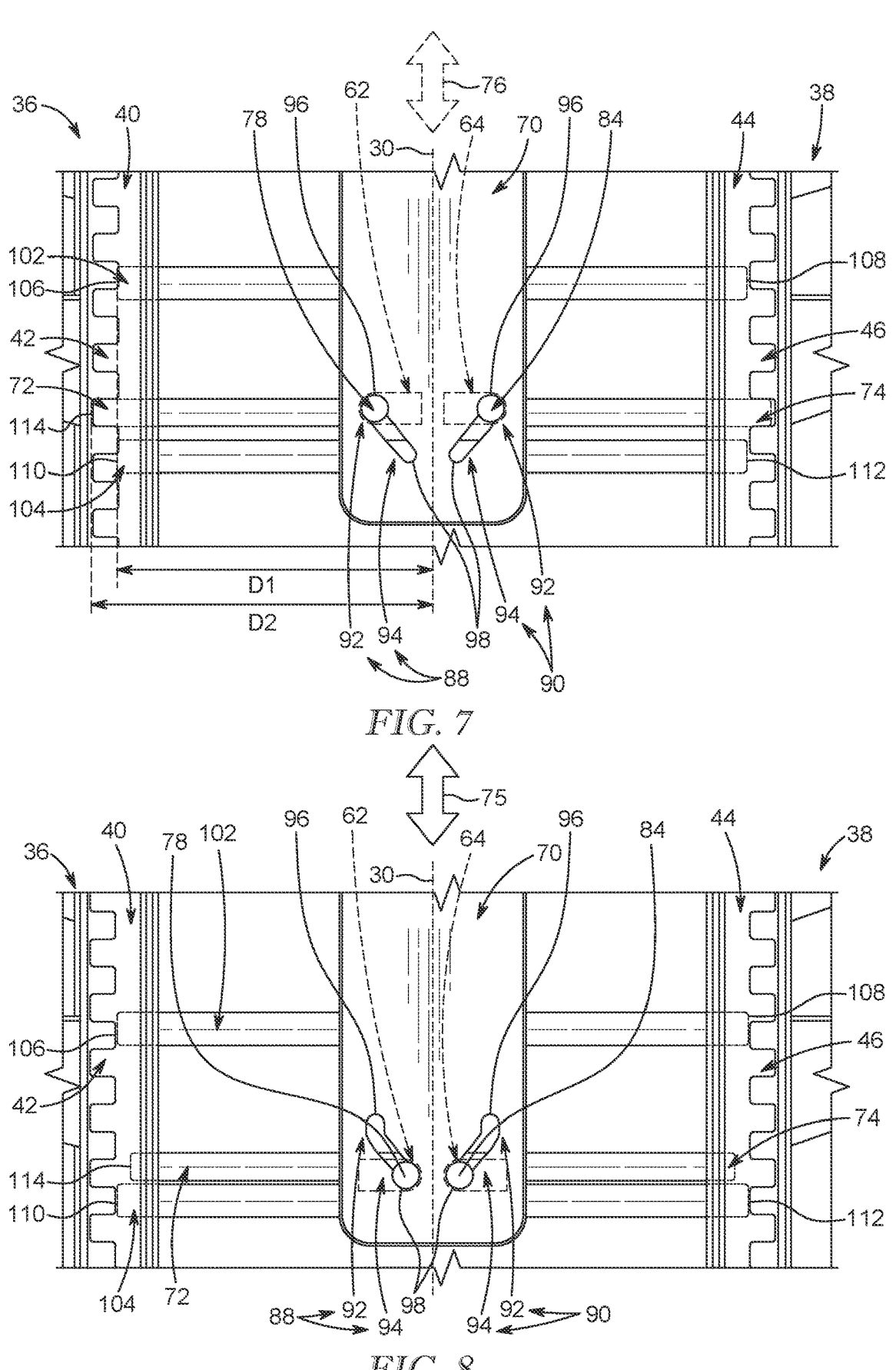

The detailed description particularly refers to the accompanying figures in which:

FIG. 1 is a perspective and diagrammatic view of a child restraint, in accordance with the present disclosure, showing the child restraint includes a seat base configured to rest on a vehicle seat and to be secured to the vehicle seat and a juvenile seat coupled to the seat base and configured to support a child for transportation in the vehicle, the juvenile seat including a seat bottom and a seat back arranged to extend upwardly from the seat bottom, and the seat back having a backrest coupled to the seat bottom, a movable headrest coupled to the backrest, and a headrest-height controller configured to control up-and-down movement of the movable headrest relative to the seat back between a lowered position, as shown in FIG. 1, and a relatively higher, raised position, as shown in FIG. 2;

FIG. 2 is a view similar to FIG. 1 showing that the movable headrest is in the raised position as compared to the lowered position shown in FIG. 1, the headrest-height controller including an adjustment handle coupled to the movable headrest for movement between an unactuated position in which the movable headrest is blocked from up-and-down movement relative to the backrest and an actuated position in which the movable headrest if free for up-and-down movement relative to the backrest so that a height of the movable headrest relative to the seat bottom can be adjusted;

FIG. 3 is an exploded assembly view of the juvenile seat of FIGS. 1 and 2 showing, from left to right, a front cover of the movable headrest, the headrest-height controller, a back cover of the movable headrest, a support frame of the backrest, and the seat bottom and a backrest shell of the backrest extending upwardly from the seat bottom;

FIG. 4 is an exploded assembly view of the headrest-height controller and the support frame from FIG. 3 showing the support frame includes first and second side frame members, each formed to include a guide channel and a plurality of apertures opening into the guide channel, and showing the headrest-height controller includes an adjustment handle, a pair of lock pins configured to extend through a respective aperture formed in the first and second side frame members, and a pair of guide bars configured to extend into each channel of the first and second side frame members;

FIG. 5 is an enlarged portion of the juvenile seat of FIG. 1 showing the adjustment handle in the unactuated position in which the first lock pin extends into one of the apertures formed in the first side frame member of the support frame and the second lock pin extends into one of the apertures formed in the second side frame member of the support frame so that the movable headrest is blocked from up-and-down movement;

FIG. 6 is an enlarged portion of the juvenile seat of FIG. 1 showing the adjustment handle in the actuated position in which the first lock pin and the second lock pin are withdrawn from the apertures formed in the first and second side frame members of the support frame so that the movable headrest is free for up-and-down movement;

FIG. 7 is an enlarged portion of the juvenile seat of FIG. 1 showing each lock pin includes a lock-pin guide post, and showing the adjustment handle is formed to include first and second angled slots configured to receive a respective lock-pin guide post to guide inward and outward movement of the lock pins from an extended position inserted in respective apertures formed in the first and second side frame members as shown in FIG. 7, and a retracted position, withdrawn from the apertures formed in the first and second side frame members as shown in FIG. 8; and FIG. 8 is an enlarged portion of the juvenile seat of FIG. 1 showing the lock pins in the retracted position in response to an upward movement of the adjustment handle to cause each lock-pin guide post to slide inwardly toward one another and withdraw the lock pins from the apertures formed in the first and second side frame members as each lock-pin guide post travels from an uppermost end of each respective angled slot to an opposite, lowermost end of each respective angled slot so that the movable headrest is free for up-and-down movement to adjust the height of the movable headrest relative to the seat bottom.

DETAILED DESCRIPTION

A child restraint 10 is adapted to be secured to a vehicle seat 11 as shown in FIGS. 1 and 2. The child restraint 10 includes a seat base 12 and a juvenile seat 14 supported by the seat base 12. The seat base 12 is adapted to rest on the vehicle seat 11 and to be secured to the vehicle seat 11 for transportation in a vehicle. The juvenile seat 14 is formed to include a child-receiving space 18 sized to receive a child therein. The juvenile seat 14 may be coupled to the seat base 12 so as to be supported in spaced apart relation to the vehicle seat 11. In some embodiments, the juvenile seat 14 may rest directly on and attach to the vehicle seat 11 so as to be used without the seat base 12.

In illustrative embodiments, the juvenile seat 14 includes a seat bottom 20 and a seat back 22 as shown in FIGS. 1 and 2. The seat bottom 20 engages the seat base 12. The seat back 22 is arranged to extend upwardly away from the seat bottom 20. The seat bottom 20 and the seat back 22 cooperate to form the child-receiving space 18 sized to receive the child therein.

The seat back 22 cooperates with the seat bottom 20 to support the child within the child-receiving space 18 and can be adjusted to fit the child as the child grows as suggested in FIGS. 1 and 2. The seat back 22 includes a backrest 24, a movable headrest 26, and a headrest-height controller 28 as shown in FIGS. 1 and 2. The backrest 24 is coupled to the seat bottom 20. The movable headrest 26 is coupled to the backrest 24 for up-and-down movement relative to the backrest 24 and is configured to support at least a portion of the child, such as a head of the child. A height of the movable headrest 26 relative to the seat bottom 20 is adjustable from a lowered position 25, as shown in FIG. 1, and a relatively higher, raised position 27, as shown in FIG. 2. The headrest-height controller 28 is arranged to extend between and interconnect the movable headrest 26 and the backrest 24. The headrest-height controller 28 selectively blocks up-and-down movement of the movable headrest 26 along the backrest 24 to maintain the lowered position 25 of the movable headrest 26, as shown in FIG. 1, the raised position 27 of the movable headrest 26, as shown in FIG. 2, or any number of intermediate positions between the lowered position 25 and the raised position 27.

The backrest 24 of the seat back 22 includes a backrest shell 32 and a support frame 34 located between the backrest shell 32 and the movable headrest 26 as shown in FIG. 3. The support frame 34 is coupled to the backrest shell 32 and provides structural support for the movable headrest 26. In some embodiments, the backrest 24 may be a monolithic component (e.g., one piece).

The backrest shell 32 is formed to include a first crossbar aperture 45 and a second crossbar aperture 47 as shown in FIG. 3. The first crossbar aperture 45 and the second crossbar aperture 47 are aligned vertically with each other relative to the centerline 30.

The support frame 34 cooperates with the headrest-height controller 28 to selectively block up-and-down movement of the movable headrest 26 relative to the backrest 24. The support frame 34 includes a first side frame member 36 and a second side frame member 38 as shown in FIGS. 3 and 4. The first side frame member 36 and the second side frame member 38 are positioned on opposing lateral sides of the backrest shell 32 and lie in spaced apart relation to each other on each side of a centerline 30 of the backrest shell 32.

The first side frame member 36 of the support frame 34 is formed to include a first guide channel 40, a plurality of first apertures 42 opening into the first guide channel 40, and a first crossbar aperture 43 as shown in FIGS. 3 and 4. The first guide channel 40 extends along the first side frame member 36 substantially parallel to the centerline 30. The plurality of first apertures 42 are formed along at least a portion of the first guide channel 40. The first crossbar aperture 43 is formed at an upper end of the first side frame member 36 and located on the first side frame member 36 behind the first guide channel 40.

The second side frame member 38 of the support frame 34 is formed to include a second guide channel 44, a plurality of second apertures 46 opening into the second guide channel 44, and a second crossbar aperture 51 as shown in FIG. 4. The second guide channel 44 extends along the second side frame member 38 substantially parallel to the centerline 30. The plurality of second apertures 46 are formed along at least a portion of the second guide channel 44. The second crossbar aperture 51 is formed at an upper end of the second side frame member 38 and located on the second side frame member 38 behind the second guide channel 44. The first crossbar aperture 43 and the second crossbar aperture 51 are aligned vertically with each other relative to the centerline 30.

The first guide channel 40 is formed in the first side frame member 36 to open toward the second side frame member 38, and the second guide channel 44 is formed in the second side frame member 38 to open toward the first side frame member 36 as shown in FIG. 4. The first guide channel 40 and the second guide channel 44 face each other such that the plurality of first apertures 42 and the plurality of second apertures 46 open toward one another. Each of the plurality of first apertures 42 is aligned with a corresponding one of the plurality of second apertures 46 as shown in FIG. 4.

In the illustrative embodiment, the plurality of first apertures 42 are formed in a single column along the first guide channel 40, and the plurality of second apertures 46 are formed in a single column along the second guide channel 44 as shown in FIG. 4. Each of the guide channels 40, 44 and the corresponding columns of apertures 42, 46 form a curved arrangement that is concave relative to the child-receiving space 18 so that an orientation of the movable headrest 26 changes as the movable headrest moves between the lowered position 25 and the raised position 27. In the illustrative embodiment, the plurality of first apertures 42 and the plurality of second apertures 46 are formed as through holes. In an alternative embodiment, the plurality of first apertures 42 and the plurality of second apertures 46 are formed as blind holes.

The support frame 34 of the backrest 24 further includes one or more crossbar(s) 48 extending between and interconnecting the first side frame member 36 and the second side frame member 38 as shown in FIG. 4. In the illustrative embodiment, one crossbar 48 extends between the first side frame member 36 and the second side frame member 38 at the upper end of each side frame member 36, 38 and a second crossbar 48 extends between the first side frame member 36 and the second side frame member 38 at a lower end of each side frame member 36, 38.

The crossbar 48 may be directly coupled to the seat base 12 as suggested in FIG. 4. Because the crossbar 48 is directly coupled to the seat base 12, the crossbar 48 transfers loads imparted on the movable headrest 26 by the child directly to the seat base 12, and thus, the vehicle seat 11 during impact events.

The first crossbar aperture 43 formed in the first side frame member 36 and the second crossbar aperture 51 formed in the second side frame member 38 are formed to receive the crossbar 48 therein as shown in FIG. 3. The crossbar 48 extends through the first crossbar aperture 43 formed in the first side frame member 36 and through the second crossbar aperture 51 formed in the second side frame member 38.

The first crossbar aperture 45 and the second crossbar aperture 47 formed in the backrest shell 32 are formed to receive the crossbar 48 therein as suggested in FIG. 3. The crossbar 48 extends through the first crossbar aperture 45 and the second crossbar aperture 47 formed in the backrest shell 32, as well as the first crossbar aperture 43 formed in the first side frame member 36 and the second crossbar aperture 51 formed in the second side frame member 38, to couple the support frame 34 to the backrest shell 32.

The movable headrest 26 is configured to be moved up-and-down relative to the backrest 24 along the centerline 30 between the lowered position 25, as shown in FIG. 1, and the raised position 27, as shown in FIG. 2. The centerline 30 may also be referred to as a headrest-travel path 30. The movable headrest 26 includes a front cover 50 and a back cover 52 as shown in FIG. 3. The front cover 50 is located in front of the back cover 52 to locate the headrest-height controller 28 therebetween as shown in FIG. 3. The front cover 50 of the movable headrest 26 supports at least a portion of the child in the juvenile seat 14. The back cover 52 includes a first outer wall 53 and a second outer wall 55 in parallel spaced apart relation to the first outer wall 53 as shown in FIG. 3. The first outer wall 53 and the second outer wall 55 are substantially parallel to the centerline 30. The back cover 52 of the movable headrest 26 is formed to include a first lock-pin sleeve 54 and a second lock-pin sleeve 56 as shown in FIGS. 3 and 5.

The first lock-pin sleeve 54 and the second lock-pin sleeve 56 are formed on opposing lateral sides of the back cover 52 and extend perpendicular to the centerline 30 as shown in FIGS. 3 and 5. The first lock-pin sleeve 54 and the second lock-pin sleeve 56 are aligned with each other relative to the centerline 30. The first lock-pin sleeve 54 extends through the first outer wall 53 of the back cover 52 such that a through hole is formed in the first outer wall 53. The second lock-pin sleeve 56 extends through the second outer wall 55 of the back cover 52 such that a through hole is formed in the second outer wall 55 aligned with the through hole formed in the first outer wall 53.

In an alternative embodiment, the first lock-pin sleeve 54 and the second lock-pin sleeve 56 are formed as a single, continuous lock-pin sleeve. In an alternative embodiment, the first lock-pin sleeve 54 and the second lock-pin sleeve 56 are formed in the front cover 50.

The back cover 52 is further formed to include a first headrest guide bar sleeve 58 and a second headrest guide bar sleeve 60 as shown in FIGS. 3 and 5. The first and the second lock-pin sleeves 54, 56, the first headrest guide bar sleeve 58, and the second headrest guide bar sleeve 60 are all in parallel spaced apart relation to one another.

The first headrest guide bar sleeve 58 is formed in the back cover 52 above the first lock-pin sleeve 54 and the second lock-pin sleeve 56 as shown in FIG. 5. The second headrest guide bar sleeve 60 is formed in the back cover 52 below the first lock-pin sleeve 54 and the second lock-pin sleeve 56. The first headrest guide bar sleeve 58 extends through the first outer wall 53 and the second outer wall 55 of the back cover 52 such that a through hole is formed in each of the first outer wall 53 and the second outer wall 55. The second headrest guide bar sleeve 60 extends through the first outer wall 53 and the second outer wall 55 of the back cover 52 such that a through hole is formed in each of the first outer wall 53 and the second outer wall 55. In an alternative embodiment, the first headrest guide bar sleeve 58 and the second headrest guide bar sleeve 60 are formed in the front cover 50.

The back cover 52 is further formed to define a first elongated guide post hole 62 and a second elongated guide post hole 64 as shown in FIGS. 7 and 8. The first elongated guide post hole 62 is formed in the first lock-pin sleeve 54, and the second elongated guide post hole 64 is formed in the second lock-pin sleeve 56.

The back cover 52 is additionally formed to define a first shoulder strap guide 66 and a second shoulder strap guide 68 as shown in FIGS. 5 and 6. The first and the second shoulder strap guides 66, 68 extend through the back cover 52 on opposing lateral sides of the centerline 30.

The headrest-height controller 28 controls up-and-down movement of the movable headrest 26 along the centerline 30 to lock the movable headrest 26 in the lowered position 25, as shown in FIG. 1, or the raised position 27, as shown in FIG. 2. The headrest-height controller 28 includes an adjustment handle 70, a first lock pin 72, and a second lock pin 74 as shown in FIG. 3.

The adjustment handle 70 is coupled to the movable headrest 26 for movement relative to the movable headrest 26 between an unactuated position 76, as shown in FIG. 5, and an actuated position 75, as shown in FIG. 6. When the adjustment handle 70 is in the unactuated position 76, the movable headrest 26 is blocked from up-and-down movement along the centerline 30 relative to the backrest 24. When the adjustment handle 70 is in the actuated position 75, the movable headrest 26 is free for up-and-down movement relative to the backrest 24 along the centerline 30 to adjust the height of the movable headrest 26 relative to the seat bottom 20.

The adjustment handle 70 is formed to include a first angled slot 88 and a second angled slot 90 as shown in FIGS. 4, 7, and 8. The first angled slot 88 and the second angled slot 90 are formed on the adjustment handle 70 on opposing lateral sides of the centerline 30. Each angled slot 88, 90 includes a vertical portion 92 and an angled portion 94 connected to the respective vertical portion 92. The vertical portion 92 of each angled slot 88, 90 is located above the respective angled portion 94. The vertical portion 92 of each angled slot 88, 90 is substantially parallel to the centerline 30. The vertical portion 92 of each angled slot 88, 90 defines an uppermost end 96 of each angled slot 88, 90, and the angled portion 94 of each angled slot 88, 90 defines a lowermost end 98 of each angled slot 88, 90 opposite the uppermost end 96.

The angled portion 94 of each angled slot 88, 90 extends downwardly toward the seat bottom 20 as shown in FIGS. 4, 7, and 8. The angled portion 94 of each angled slot 88, 90 converges toward one another such that the angled portion 94 of each angled slot 88, 90 is angled inwardly toward the centerline 30. The angled portion 94 of each angled slot 88, 90 extends at an angle of about 45 degrees relative to a direction of travel of the respective first and second lock pin 72, 74.

The first lock pin 72 of the headrest-height controller 28 is sized to be received by the first lock-pin sleeve 54 formed in the back cover 52 and the plurality of first apertures 42 formed in the first side frame member 36 of the support frame 34 as shown in FIG. 7. A distal end 114 of the first lock pin 72 extends into one of the plurality of first apertures 42. The first lock pin 72 extends through the first guide channel 40 and into one of the plurality of first apertures 42 formed in the first side frame member 36 when the adjustment handle 70 is in the unactuated position 76 as shown in FIG. 5. When the adjustment handle 70 is in the unactuated position 76, the first lock pin 72 is in an extended position in which the first lock pin 72 extends into one of the plurality of first apertures 42 as shown in FIG. 7. The first lock pin 72 is configured to slide within the first lock-pin sleeve 54 such that the first lock pin 72 can be withdrawn from the one of the plurality of first apertures 42. When the first lock pin 72 is withdrawn from the one of the plurality of first apertures 42, the first lock pin 72 is in a withdrawn position as shown in FIG. 8.

The first lock pin 72 is formed to include a through hole 77 as shown in FIG. 4. The first lock pin 72 includes a bias member 80 and a first lock-pin guide post 78 that extends through the through hole 77 formed in the first lock pin 72. The first lock-pin guide post 78 is substantially perpendicular to the first lock pin 72.

The through hole 77 formed in the first lock pin 72 is formed to receive the first lock-pin guide post 78 therein as suggested in FIG. 4. The first lock-pin guide post 78 extends through the first angled slot 88 formed in the adjustment handle 70, through the through hole 77 formed in the first lock pin 72, and through the first elongated guide post hole 62 formed in the first lock-pin sleeve 54. The first lock-pin guide post 78 is configured to slide within the first angled slot 88 and the first elongated guide post hole 62 to move the first lock pin 72 within the first lock-pin sleeve 54 between the extended position, as shown in FIG. 7, and the withdrawn position, as shown in FIG. 8.

The second lock pin 74 of the headrest-height controller 28 is sized to be received by the second lock-pin sleeve 56 formed in the back cover 52 and the plurality of second apertures 46 formed in the second side frame member 38 of the support frame 34 as shown in FIG. 7. The second lock pin 74 extends through the second guide channel 44 and into one of the plurality of second apertures 46 formed in the second side frame member 38 when the adjustment handle 70 is in the unactuated position 76 as shown in FIG. 5. When the adjustment handle 70 is in the unactuated position 76, the second lock pin 74 is in an extended position in which the second lock pin 74 extends into one of the plurality of second apertures 46 as shown in FIG. 7. The second lock pin 74 is configured to slide within the second lock-pin sleeve 56 such that the second lock pin 74 can be withdrawn from the one of the plurality of second apertures 46. When the second lock pin 74 is withdrawn from the one of the plurality of second apertures 46, the second lock pin 74 is in a withdrawn position as shown in FIG. 8.

The second lock pin 74 is formed to include a through hole 82 as shown in FIG. 4. The second lock pin 74 includes a bias member 86 and a second lock-pin guide post 84 that extends through the through hole 82 formed in the second lock pin 74. The second lock-pin guide post 84 is substantially perpendicular to the second lock pin 74.

The through hole 82 formed in the second lock pin 74 is formed to receive the second lock-pin guide post 84 therein as suggested in FIG. 4. The second lock-pin guide post 84 extends through the second angled slot 90 formed in the adjustment handle 70, through the through hole 82 formed in the second lock pin 74, and through the second elongated guide post hole 64 formed in the second lock-pin sleeve 56. The second lock-pin guide post 84 is configured to slide within the second angled slot 90 and the second elongated guide post hole 64 to move the second lock pin 74 within the second lock-pin sleeve 56 between the extended position, as shown in FIG. 7, and the withdrawn position, as shown in FIG. 8.

When the adjustment handle 70 is in the unactuated position 76, the first and the second lock pins 72, 74 are in the extended positon and extend into one of the respective plurality of apertures 42, 46, as shown in FIGS. 5 and 7, to block up-and-down movement of the movable headrest 26. When the adjustment handle 70 is in the actuated position 75, the first and the second lock pins 72, 74 are in the withdrawn position. In the withdrawn position, the first and the second lock pins 72, 74 are withdrawn from the respective one of the plurality of apertures 42, 46 through inward movement toward the centerline 30 such that the first and the second lock pins 72, 74 do not extend into the respective one of the plurality of apertures 42, 46 to free the movable headrest 26 for up-and-down movement, as shown in FIGS. 6 and 8.

The first and the second lock-pin guide post 78, 84 are normally arranged to lie against the uppermost end 96 of the respective vertical portion 92 of the respective angled slot 88, 90 as shown in FIG. 7. When the adjustment handle 70 is in the unactuated position 76, the first and the second lock pin 72, 74 extend through the respective one of the plurality of apertures 42, 46 and the first and the second lock-pin guide post 78, 84 lie against the uppermost end 96 of the respective angled slot 88, 90. The respective vertical portion 92 blocks the first and the second lock pin 72, 74 from withdrawing from the respective one of the plurality of apertures 42, 46 during loading and/or impact events while the adjustment handle 70 is in the unactuated position 76. The vertical portion 92 also provides a period of lost motion where squeezing the adjustment handle 70 does not withdraw the first and the second lock pins 72, 74 so that a user gains momentum while actuating the adjustment handle 70 to assist the user in withdrawing the first and the second lock pins 72, 74.

Upward movement of the adjustment handle 70 relative to the movable headrest 26 pulls the first and the second lock pin 72, 74 out of the respective one of the plurality of apertures 42, 46 such that the first and the second lock pin 72, 74 move inwardly toward the centerline 30 and/or toward each other as shown in FIGS. 6 and 8. Additionally, during upward movement of the adjustment handle 70, the first and the second lock-pin guide post 78, 84 slides within the respective angled slot 88, 90 formed in the adjustment handle 70 and the respective elongated guide post hole 62, 64 formed in the back cover 52 so that the first and the lock-pin guide post 78, 84 slides to the lowermost end 98 of the respective angled slot 88, 90 as shown in FIGS. 6 and 8.

The bias members 80, 86 of the first and the second lock pin 72, 74 are configured to urge the first and the second lock pin 72, 74 outwardly away from the centerline 30 and into the respective one of the plurality of apertures 42, 46 when the adjustment handle 70 is in the unactuated position 76 as suggested in FIG. 5. In one embodiment, the bias members 80, 86 are compression springs. In alternative embodiments, the bias members 80, 86 are any other suitable mechanism configured to bias the first and the second lock pin 72, 74 outwardly away from each other.

The headrest-height controller 28 further includes a first headrest guide bar 102 and a second headrest guide bar 104 as shown in FIG. 4. The first headrest guide bar 102 and the second headrest guide bar 104 are coupled to the movable headrest 26 in a fixed position relative to the movable headrest 26. The first and the second headrest guide bar 102, 104 support the movable headrest 26 on the support frame 34 for smooth up-and-down movement of the movable headrest 26 relative to the backrest 24. In some embodiments, one of the first and the second headrest guide bars 102, 104 may be omitted.

The first headrest guide bar 102 extends through the first headrest guide bar sleeve 58 formed in the back cover 52 as shown in FIG. 5. The first headrest guide bar 102 is located above the first and the second lock pin 72, 74 and above the second headrest guide bar 104.

The first headrest guide bar 102 has a first end 106 and a second end 108 opposite the first end 106 as shown in FIG. 7. The first end 106 of the first headrest guide bar 102 lies within the first guide channel 40 formed in the first side frame member 36 of the support frame 34, and the second end 108 of the first headrest guide bar 102 lies within the second guide channel 44 formed in the second side frame member 38 of the support frame 34. The first end 106 and the second end 108 of the first headrest guide bar 102 do not extend into the respective plurality of apertures 42, 46. Instead, the first end 106 and the second end 108 slide and/or roll within the first guide channel 40 and the second guide channel 44 as the adjustment handle 70 is moved upwardly.

The second headrest guide bar 104 extends through the second headrest guide bar sleeve 60 formed in the back cover 52 as shown in FIG. 5. The second headrest guide bar 104 is located below the first and the second lock pins 72, 74.

The second headrest guide bar 104 has a first end 110 and a second end 112 opposite the first end 110. The first end 110 of the second headrest guide bar 104 lies within the first guide channel 40 formed in the first side frame member 36 of the support frame 34, and the second end 112 of the second headrest guide bar 104 lies within the second guide channel 44 formed in the second side frame member 38 of the support frame 34. The first end 110 and the second end 112 of the second headrest guide bar 104 do not extend into the respective plurality of apertures 42, 46. Instead, the first end 110 and the second end 112 slide and/or roll within the first guide channel 40 and the second guide channel 44 as the adjustment handle 70 is moved upwardly.

The first headrest guide bar 102 extends a first distance D1 from the centerline 30 to the first end 106 of the first headrest guide bar 102 as shown in FIGS. 7 and 8. The second headrest guide bar 104 extends the first distance D1 from the centerline 30 to the first end 110 of the second headrest guide bar 104 as shown in FIGS. 7 and 8. When the adjustment handle 70 is in both the unactuated position 76, as shown in FIG. 7, and the actuated position 75, as shown in FIG. 8, the first headrest guide bar 102 and the second headrest guide bar 104 extend the first distance D1 from the centerline 30 and into the first guide channel 40.

When the adjustment handle 70 is in the unactuated position 76, the first lock pin 72 extends a second distance D2 from the centerline 30 to the distal end 114 of the first lock pin 72 located within the one of the plurality of first apertures 42 as shown in FIG. 7. As shown in FIG. 7, when the adjustment handle 70 is in the unactuated position 76, the first distance D1 is less than the second distance D2 such that the first and the second headrest guide bars 102, 104 extend into the first guide channel 40 formed in the first side frame member 36, but do not extend into the first guide channel 40 as far as the first lock pin 72.

In some embodiments, the headrest-height controller 28 further includes a main bias member 116 to bias the adjustment handle 70 downwardly toward the seat bottom 20 as shown in FIG. 5. The main bias member 116 biases the adjustment handle 70 to a lower position to force the first and the second lock pin 72, 74 into the respective one of the plurality of apertures 42, 46 such that the bias members 80, 86 are omitted.

A headrest assembly 29 includes the movable headrest 26, the headrest-height controller 28, and the support frame 34 as shown in FIG. 3. To assemble the juvenile seat 14, the support frame 34 is placed against the backrest shell 32 without the crossbar 48 at the upper end of the first side frame member 36 and the second side frame member 38. The first crossbar aperture 43 of the first side frame member 36 is aligned with the first crossbar aperture 45 formed in the backrest shell 32. The second crossbar aperture 51 of the second side frame member 38 is aligned with the second crossbar aperture 47 formed in the backrest shell 32. The back cover 52 of the movable headrest 26 is placed against the support frame 34. The headrest-height controller 28 is placed against the back cover 52 and the guide bars 102, 104 and lock pins 72, 74 are inserted into the guide channels 40, 44 and apertures 42, 46, respectively. The front cover 50 of the movable headrest 26 is then placed in front of the headrest-height controller 28 to enclose the headrest-height controller 28 between the front and back covers 50, 52. The crossbar 48 is then inserted laterally through the first crossbar aperture 45 formed in the backrest shell 32, the first crossbar aperture 43 of the first side frame member 36, the second crossbar aperture 51 of the second side frame member 38, and the second crossbar aperture 47 formed in the backrest shell 32. This structure and assembly process of the headrest assembly 29 facilitates installation of the movable headrest 26 with the support frame 34 and increases the strength of the assembly 29 as a whole.

The juvenile seat 14 further includes a child restraint harness having a pair of shoulder straps 118. The pair of shoulder straps 118 extend through the first shoulder strap guide 66 and the second shoulder strap guide 68 formed in the back cover 52 as shown in FIG. 5. The pair of shoulder straps 118 extend through the first and the second shoulder strap guides 66, 68 below the first headrest guide bar 102 and above the first and the second lock pins 72, 74 and the second headrest guide bar 104 to provide support for the child during an impact event.

The invention claimed is:

1. A juvenile seat comprising:

a seat bottom and a seat back arranged to extend upwardly away from the seat bottom, the seat back including a backrest coupled to the seat bottom, a movable headrest coupled to the backrest for up-and-down movement along a headrest-travel path relative to the backrest, and a headrest-height controller arranged to extend between and interconnect the backrest and the movable headrest to selectively block up-and-down movement of the movable headrest relative to the backrest, wherein the backrest includes a backrest shell and a support frame coupled to the backrest shell and having a first side frame member formed to include a first guide channel and a plurality of first apertures opening into the first guide channel and a second side frame member formed to include a second guide channel and a plurality of second apertures opening into the second guide channel, each aperture in the plurality of first apertures being aligned with a corresponding aperture in the plurality of second apertures, and wherein the headrest-height controller includes a first lock pin configured to extend through one of the plurality of first apertures formed in the first side frame member, an opposite, second lock pin configured to extend through one of the plurality of second apertures formed in the second side frame member, and an adjustment handle coupled to the movable headrest for movement relative to the movable headrest between an unactuated position in which the first and second lock pins extend into the one of the plurality of first apertures and the one of the plurality of second apertures to block up-and-down movement of the movable headrest relative to the backrest and an actuated position in which the adjustment handle pulls the first and second lock pins inwardly toward one another and out of the one of the plurality of first apertures and the one of the plurality of second apertures so that the movable headrest is free for up-and-down movement relative to the backrest, and wherein the adjustment handle is formed to include a pair of slots, each lock pin includes a lock-pin guide post that extends into a respective one of the pair of slots, and each slot of the pair of slots includes a vertical portion and an angled portion.

2. The juvenile seat of claim 1, wherein the pair of angled slots converge toward one another as the pair of angled slots extend downwardly toward the seat bottom and the first and second lock pins are normally arranged to lie against an uppermost end of each respective angled slot so that upward movement of the adjustment handle relative to the movable headrest causes each lock pin to be pulled inwardly as each lock-pin guide post travels through each respective angled slot from the uppermost end to a lowermost end of each angled slot.

3. The juvenile seat of claim 2, wherein the movable headrest is formed to include a first lock-pin sleeve sized to receive the first lock pin therein and a second lock-pin sleeve sized to receive the second lock pin therein, and wherein a compression spring urges the first and second lock pins outwardly away from one another and into the one of the plurality of first apertures and the one of the plurality of second apertures when the adjustment handle is in the unactuated position.

4. The juvenile seat of claim 3, wherein at least a portion of each angled slot extends at an angle of about 45 degrees relative to a direction of travel of each lock pin.

5. The juvenile seat of claim 1, wherein the vertical portion of each slot of the pair of slots is in communication with the angled portion and the vertical portion is located above the angled portion.

6. The juvenile seat of claim 1, wherein the headrest-height controller further includes at least one headrest guide bar coupled to the movable headrest in a fixed position relative to the movable headrest and configured to support the movable headrest on the support frame for smooth up-and-down movement relative to the backrest.

7. The juvenile seat of claim 1, wherein the headrest-height controller further includes a first headrest guide bar coupled to the movable headrest in a fixed position relative to the movable headrest and configured to support the movable headrest on the support frame for smooth up-and-down movement relative to the backrest and a second headrest guide bar coupled to the movable headrest in a fixed position relative to the movable headrest and configured to support the movable headrest on the support frame for smooth up-and-down movement relative to the backrest, the first headrest guide bar positioned above the first and second lock pins, and the second headrest guide bar positioned below the first and second lock pins.

8. The juvenile seat of claim 7, wherein each headrest guide bar includes a first end and a second end opposite the first end, the first end of each headrest guide bar extends into the first guide channel formed in the first side frame member of the support frame, and the second end of each headrest guide bar extends into the second guide channel formed in the second side frame member of the support frame.

9. A juvenile seat comprising:
a seat bottom and
a seat back arranged to extend upwardly away from the seat bottom, the seat back having a backrest coupled to the seat bottom, a movable headrest coupled to the backrest for up-and-down movement along a headrest-travel path relative to the backrest, and a headrest-height controller arranged to extend between and interconnect the backrest and the movable headrest to selectively block up-and-down movement of the movable headrest relative to the backrest,
wherein the backrest includes a backrest shell and a support frame coupled to the backrest shell and having a side frame member formed to include a guide channel that extends substantially parallel to the headrest-travel path and a plurality of apertures opening into the guide channel,
wherein the headrest-height controller includes a lock pin arranged to lie in the guide channel and extend through one of the plurality of apertures to block up-and-down movement of the movable headrest relative to the backrest when the headrest-height controller is in an unactuated position, the lock pin is configured to move laterally out of the one of the plurality of apertures to slide within the guide channel so that the movable headrest is free for up-and-down movement relative to the backrest when the headrest-height controller is in an actuated position,
wherein the headrest-height controller includes an adjustment handle coupled to the movable headrest for movement relative to the movable headrest, the adjustment handle being configured to pull the pin out of the one of the plurality of apertures,
wherein the adjustment handle is formed to include an angled slot, and wherein the lock pin includes a lock-pin guide post that extends into the angled slot, and
wherein the angled slot includes a vertical portion and an angled portion connected to the vertical portion, and the vertical portion is located above the angled portion.

10. The juvenile seat of claim 9, wherein the angled slot includes an uppermost end formed in the vertical portion of the angled slot and a lowermost end formed in the angled portion of the angled slot, and the lock-pin guide post is arranged to lie against the uppermost end of the respective angled slot when the headrest-height controller is in the unactuated position.

11. The juvenile seat of claim 10, wherein the lock-pin guide post is arranged to lie against the lowermost end of the angled slot opposite the uppermost end when the headrest-height controller is in the actuated position.

12. The juvenile seat of claim 9, wherein at least a portion of the angled slot extends at an angle of about 45 degrees relative to a direction of travel of the lock pin.

13. The juvenile seat of claim 9, wherein the headrest-height controller further includes a first headrest guide bar coupled to the movable headrest in a fixed position relative to the movable headrest and configured to support the movable headrest on the support frame for smooth up-and-down movement relative to the backrest.

14. The juvenile seat of claim 13, wherein the headrest-height controller further includes a second headrest guide bar coupled to the movable headrest in a fixed position relative to the movable headrest and configured to support the movable headrest on the support frame for smooth up-and-down movement relative to the backrest.

15. A juvenile seat comprising:

a seat bottom and a seat back arranged to extend upwardly away from the seat bottom, the seat back having a backrest coupled to the seat bottom, a movable headrest coupled to the backrest for up-and-down movement along a headrest-travel path relative to the backrest, and a headrest-height controller arranged to extend between and interconnect the backrest and the movable headrest to selectively block up-and-down movement of the movable headrest relative to the backrest, wherein the backrest includes a backrest shell and a support frame coupled to the backrest shell and having a side frame member formed to include a guide channel that extends substantially parallel to the headrest-travel path and a plurality of apertures opening into the guide channel, wherein the headrest-height controller includes a lock pin arranged to lie in the guide channel and extend through one of the plurality of apertures to block up-and-down movement of the movable headrest relative to the backrest when the headrest-height controller is in an unactuated position, the lock pin is configured to move laterally out of the one of the plurality of apertures to slide within the guide channel so that the movable headrest is free for up-and-down movement relative to the backrest when the headrest-height controller is in a actuated position, wherein the headrest-height controller further includes a first headrest guide bar coupled to the movable headrest in a fixed position relative to the movable headrest and configured to support the movable headrest on the support frame for smooth up-and-down movement relative to the backrest, wherein the headrest-height controller further includes a second headrest guide bar coupled to the movable headrest in a fixed position relative to the movable headrest and configured to support the movable headrest on the support frame for smooth up-and-down movement relative to the backrest, and wherein the first headrest guide bar and the second headrest guide bar are located in parallel spaced apart relation, the first headrest guide bar is positioned above the lock pin, and the second headrest guide bar is positioned below the lock pin.

16. The juvenile seat of claim 15, wherein the headrest-height controller includes an adjustment handle coupled to the movable headrest for movement relative to the movable headrest, the adjustment handle being configured to pull the pin out of the one of the plurality of apertures.

17. The juvenile seat of claim 16, wherein the adjustment handle is formed to include an angled slot, and wherein the lock pin includes a lock-pin guide post that extends into the angled slot.

18. The juvenile seat of claim 17, wherein the angled slot includes a vertical portion and an angled portion connected to the vertical portion, and the vertical portion is located above the angled portion.

19. The juvenile seat of claim 18, wherein the angled slot includes an uppermost end formed in the vertical portion of the angled slot and a lowermost end formed in the angled portion of the angled slot, and the lock-pin guide post is arranged to lie against the uppermost end of the respective angled slot when the headrest-height controller is in the unactuated position.

20. The juvenile seat of claim 19, wherein the lock-pin guide post is arranged to lie against the lowermost end of the angled slot opposite the uppermost end when the headrest-height controller is in the actuated position.

* * * * *